United States Patent [19]

Roussel

[11] Patent Number: 4,469,847

[45] Date of Patent: Sep. 4, 1984

[54] PROCESS FOR PREPARING GRAFT STYRENE COPOLYMERS

[75] Inventor: Robert Roussel, Mazingarge, France

[73] Assignee: Societe Chimiques des Charbonnages, Paris, France

[21] Appl. No.: 465,143

[22] Filed: Feb. 9, 1983

[30] Foreign Application Priority Data

Feb. 10, 1982 [FR] France .................................. 82 02138

[51] Int. Cl.$^3$ ...................... C08L 51/04; C08L 51/06; C08L 53/00; C08L 53/02
[52] U.S. Cl. ........................................ 525/89; 525/97; 525/98; 525/99
[58] Field of Search ....................... 525/89, 97, 98, 99, 525/71

[56] References Cited

U.S. PATENT DOCUMENTS

| | | | |
|---|---|---|---|
| 3,265,765 | 8/1966 | Holden | 260/876 |
| 3,536,784 | 10/1970 | Skendrovich | 260/876 |
| 3,639,521 | 2/1972 | Hsieh | 260/880 |
| 4,051,197 | 9/1977 | Fodor | 525/89 |
| 4,277,575 | 7/1981 | Haaf et al. | 525/89 |

FOREIGN PATENT DOCUMENTS 2074174A 10/1981 United Kingdom .

*Primary Examiner*—Allan Lieberman
*Attorney, Agent, or Firm*—Millen & White

[57] ABSTRACT

A process for preparing graft styrene copolymers is effected by a two-stage polymerization of styrene in the presence of an EPDM elastomer and styrene block copolymer. The resultant graft styrene copolymer has a fine microstructure, good impact resistance and good resistance to aging.

8 Claims, No Drawings

PROCESS FOR PREPARING GRAFT STYRENE COPOLYMERS

BACKGROUND OF THE INVENTION

The present invention relates to a process for preparing graft copolymers based on styrene and an EPDM elastomer.

Polystyrene is a thermoplastic which is widely used in the plastics industry by virtue of the ease with which it can be obtained and worked. Unfortunately, its use is limited as a result of its lack of heat stability and of its mediocre impact strength.

In order to improve these properties, it has been proposed to use copolymers of styrene with other monomers such as acrylonitrile or acrylates. It has also been proposed to use graft polymers obtained by polymerizing styrene with an elastomer, e.g., a predominantly saturated elastomer such as an ethylene/propylene elastomer or an ethylene/propylene/polyene monomer elastomer (EPDM rubber).

However, the use of such graft copolymers presents numerous difficulties. In particular, the predominantly saturated rubbers, which have a low proportion of double bonds, do not favor the grafting of styrene onto the elastomer. (The terms "rubber" and "elastomer" are used interchangeably herein.) Accordingly, the compositions obtained have a very low grafting ratio, i.e., a very low proportion of polystyrene grafted onto the elastomer, which is at most of the order of 0.5% by weight.

Furthermore, microscopic observation makes it possible to establish that the resultant compositions contain large globules of rubber which are dispersed in the composition without any cohesion, and the size of which can be as large as 10 to 15 microns.

The composition obtained with a dispersion of this type does not have a fine microstructure, resulting in products which are not very shiny and whose surface appearance is unsatisfactory. Apart from the problems described above, which relate to the heat stability and resistance to aging, the impact strength, the grafting ratio of polystyrene and also the microstructure, it is necessary, in order to obtain compositions possessing advantageous properties, to increase the degree of crosslinking of the elastomer.

When styrene is polymerized in the presence of elastomers of the ethylene/propylene/polyene monomer type, e.g., EPDM rubbers, crude graft products are obtained which comprise, in particular, a graft copolymer formed by reaction of the rubber with the styrene monomer, and rubbery units consisting of "bridged" units, i.e., rubber units joined to one another by chemical bonds. The crosslinking density of the "bridged" rubber is expressed as the "swelling index", which is inversely proportional to the degree of crosslinking, i.e., the lower the swelling index the higher the crosslinking density and the more advantageous the properties of the copolymer.

To solve these problems, processes have been proposed which include sophisticated reaction steps of the type involving the use of a mixture of special solvents, partial oxidation of the rubber before grafting, or multiple-stage polymerization. Not all these processes are satisfactory and they lead, in particular, to graft polymers which frequently still have a low grafting ratio together with a mediocre degree of crosslinking and a coarse microstructure. Examples of such processes are found, e.g., in French Pat. Nos. 2,320,950; 2,263,260; and 2,164,832.

The process of the present invention makes it possible to obtain graft copolymers not having these disadvantages.

SUMMARY OF THE INVENTION

The present invention provides a process for preparing styrene-EPDM graft copolymers, comprising the steps of:

(a) effecting a prepolymerization of styrene in the presence of an elastomeric EPDM terpolymer, and styrene block copolymer, until polymerization is about 20-30% complete; wherein the amount of EPDM terpolymer is at most 20% by weight relative to the total weight of the organic phase, and the amount of styrene block copolymer is 5-30% by weight relative to the weight of the EPDM terpolymer; and wherein the viscosity of the EPDM terpolymer is 30-100 centipoises, expressed as the viscosity of a solution of 5 weight parts of the EPDM terpolymer in 95 weight parts of styrene; and (b) effecting a suspension polymerization of the resultant mixture from step (a), in the further presence of an amount of water such that the weight ratio organic phase:water phase is from 0.8:1 to 1.3:1, and recovering the resultant graft copolymer.

The invention further provides a graft copolymer prepared according to the foregoing process.

Upon further study of the specification and appended claims, further objects and advantages of this invention will become apparent to those skilled in the art.

DETAILED DISCUSSION

By carrying out the process according to the invention, graft copolymers can be obtained which have a high degree of gelling of from 25 to 40%, and also a good swelling index equal to at most 15, most frequently below 10, this index denoting good crosslinking of the elastomer. Furthermore, microscopic observation of the graft copolymers obtained by the process of the invention confirms that they have good cohesion and a fine microstructure such that at least 90% of the dispersed elastomer particles have a diameter of less than 5 microns, or an average diameter less than 4 microns. Furthermore, by carrying out a process of this type, graft copolymers are obtained which have good mechanical characteristics, good resistance to aging and good heat resistance.

To carry out the process of the invention, the polymerization is effected in two stages. The first stage, in which styrene, elastomer and styrene block copolymer are reacted, is called "preliminary polymerization" or "prepolymerization". It is effected at a temperature of at most about 100° C. under conventional mass polymerization conditions. The reaction mixture obtained in this first stage is then subjected to a final polymerization in suspension, in the presence of suspending agents and at a temperature of 90°-150° C.

Suitable elastomers for use in the present process include terpolymers based on ethylene, propylene and a polyene monomer, e.g., 1,4-hexadiene, dicyclopentadiene, tricyclopentadiene, 5-vinyl-2-norbornene, 5-ethylidene-2-norbornene, 5-methylene-2-norbornene, 5-(2-propenyl)-2-norbornene, 5-(5-hexenyl)-2-norbornene, 4,7,8,9-tetrahydroindene and isopropylidene-tetrahydroindene. Other suitable polyene monomer components of EPDM rubbers can be found in, e.g., Saltman, "The Stereo Rubbers", pp. 378–381 (John Wiley and Sons, N.Y. and London, 1977). Preferably, the elastomeric terpolymer has an ethylene content of 10–73% by weight, a propylene content of 23–77% by weight and a polyene content of 4–20% by weight (the foregoing refers to the contents of the respective monomer-derived units).

The elastomeric EPDM terpolymer is used in an amount at most 20% by weight, relative to the total weight of the organic phase.

One essential characteristic of the process of the invention is the use of styrene block copolymers in addition to styrene itself. Suitable such styrene block copolymers include, e.g., styrene/butadiene copolymers and mixtures of styrene/butadiene and styrene/ethylene copolymers. Typical commercially available block copolymers have molecular weights of 60,000 to 300,000 preferably of the order of 200,000 and contain about 38% by weight of styrene, relative to the total weight of the copolymer. Molecular weights herein are expressed as weight average molecular weights, and are measured by gel permeability chromatography. Suitable such styrene/butadiene blocks copolymers are described in U.S. Pat. Nos. 3,265,765 and 3,639,521.

Typical commercial available styrene/ethylene block copolymers have molecular weights of the order of 100,000.

Where mixtures of styrene/butadiene and styrene/ethylene block copolymers are used, the weight ratio of the styrene/butadiene copolymer to the styrene/ethylene copolymer is preferably at least about 1:1.

According to the invention, the styrene block copolymers are used in amounts of 5 to 30% by weight, preferably 15–25%, relative to the amount of elastomer. The use of an amount of more than about 30% by weight is to no advantage, because the mechanical properties, in particular the impact strength, remain unchanged. Moreover, the use of such a large amount has the disadvantage of being uneconomical. The use of an amount of less than 5% by weight, relative to the elastomer, leads to products having nodules of large particle size.

Another essential characteristic of the process according to the invention is the use of elastomeric terpolymers having a low viscosity of between 30 and 100 centipoises at 20° C. The use of an elastomeric terpolymer having a high viscosity, i.e., a viscosity of more than 100 centipoises, causes perturbations in the suspension, which limits the amount used. The viscosity of the elastomeric terpolymer as used herein is defined as the viscosity at 20° C. of a solution of 5 parts by weight of elastomeric terpolymer in 95 parts by weight of styrene. Whenever the viscosity of the elastomeric terpolymer is mentioned herein, it always corresponds to this definition.

The prepolymerization step is most preferably effected substantially in the absence of water, which makes it possible to obtain graft copolymers having a highly uniform morphology. Nevertheless, it is possible to effect the prepolymerization step in the presence of as much as about 45% by weight of water, relative to the weight of the organic phase, without seriously impairing the desirable properties of the resulting graft copolymer.

The process of the invention is carried out in the following manner. The styrene, the elastomeric terpolymer, the styrene block copolymer, and optionally a small amount of water if the prepolymerization is carried out by a slightly wet method, are introduced into an autoclave fitted with a heating device, a stirrer and a cooling device. From about 0.5 to about 2% by weight of conventional polymerization catalysts, relative to the weight of the organic products, are added. Suitable catalysts include, e.g., peroxides such as benzoyl peroxide, dicumyl peroxide, ditert.-butyl peroxide, tert.-butyl perbenzoate, 2,5-dimethyl-2,5-bis-(tert.-butylperoxy)-3-hexyne and tert.-butyl perhexanoate. Chain-transfer agents such as mercaptans, e.g., n-dodecylmercaptan, can be added during the prepolymerization: these compounds are added in amounts of at most about 0.2%, relative to the organic phase. It is also possible to use known additives such as triallyl cyanurate: these are used in amounts of the order of at most 0.2%.

The prepolymerization is effected at a temperature which should not exceed 100° C., and the temperature should not exceed about 95° C. at the end of this step. Phase inversion occurs during the prepolymerization step. For about 20 to 30 minutes after the phase inversion, the medium is preferably subjected to the action of shear forces, for example with the aid of a turbine stirrer. The prepolymerization step is ended when polymerization is about 20–30% complete.

After the prepolymerization, the polymerization is completed in suspension. Additional water, or the whole of the water of the suspension if the prepolymerization has been carried out in the dry phase, is added preferably in an amount such that the weight ratio organic phase:water phase is from 0.8:1 to 1.3:1. After the addition of water, it is advantageous to increase the temperature stepwise up to a final level of 120°–150° C. This phase of the polymerization is effected for about 5–8 hours.

During this second polymerization step, it may be useful to add conventional surface-active agents and suspending agents, such as carbonates, phosphates or chlorides, in amounts of at most about 0.5% by weight of each. The catalysts used for this step are conventional polymerization catalysts such as peroxides, e.g., 2,5-dimethyl-2,5-bis-(tert.-butylperoxy)-3-hexyne or ditert.-butyl peroxide; the peroxides can be used singly or in mixtures, in amounts of between 0.5 and 2% by weight. The amounts of the above-mentioned additives and of the catalysts are expressed by weight, relative to the total weight of the organic phase.

The graft copolymer is recovered by filtration and drying.

The graft copolymers obtained by the process of the invention have good mechanical properties, together with good heat resistance and good resistance to aging. With this combination of properties, together with their fine morphology, these graft copolymers are preferred in fields of application where a good stability to aging is required, such as garden suites, caravans.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

The following are introduced into an autoclave fitted with a heating device, a stirrer and a cooling device:
88 parts by weight of styrene
9.6 parts by weight of an EPDM rubber having a monomer content of 44% by weight of ethylene, 45% by weight of propylene and 11% by weight of 5-ethylidene-2-norbornene, 5 parts by weight of the elastomer dissolved in 95 parts by weight of styrene having a viscosity of 60 centipoises at 20° C.
2.4 parts by weight of a styrene/butadiene block copolymer containing 28% of styrene block and having a number average molecular weight of 200,000.

The following are then added:
0.13 part by weight of benzoyl peroxide
0.1 part by weight of triallyl cyanurate
0.125 part by weight of n-dodecylmercaptan.

The reaction mixture is subjected to a prepolymerization step. This step is effected by initially subjecting the reaction mixture to stepwise heating so that its temperature reaches 92° C. after 60 minutes, and then stirring it for 1.5 hours with the aid of a turbine stirrer.

When this prepolymerization stage is complete, the following are added:
120 parts by weight of water
0.25 part by weight of t-butyl perbenzoate
0.6 part by weight of ditert.-butyl peroxide
0.5 part of 2,5-dimethyl-2,5-bis-(tert.-butylperoxy)-3-hexyne.

The reaction mixture is then heated stepwise so that its final temperature reaches 150° C. after 6.5 hours. This gives an organic phase, which is filtered off and dried.

The rubbery phase of the polymer obtained has a particle size distribution such that 90% of the particles have a diameter of less than 4.5 microns and an average diameter of less than 2 microns. The particle size distribution is determined by electron microscopy, according to the procedure described in Kato, in *J. Electro. Micros.*, 14, 1965 (20), using osmium tetroxide as the contrast agent. Its characteristics are summarized in Table 1.

The degree of gelling, which is a measure of the proportion of crosslinked phase, i.e., the amount of polystyrene grafted onto the elastomer, is determined by stirring a 1 g sample of the graft copolymer in toluene at room temperature, e.g., 20°-25° C., centrifuging the whole, and recovering the gel insoluble in toluene. The degree of gelling is expressed as the weight percentage of toluene-insoluble gel relative to the test sample.

The dry weight of the insoluble polymer is determined by treating the recovered insoluble gel in vacuo. The swelling index, which is a measure of the crosslinking density, is equal to the ratio of the weight of the recovered, toluene-insoluble gel to the dry weight thereof.

The Izod impact strength is determined according to ASTM Standard D-256.

The modulus of rigidity is determined according to ASTM Standard D-63.872, and breaking load is determined according to ASTM Standard D-63872.

TABLE 1

| Degree of gelling % | Swelling index | Izod impact strength kg-cm/cm | Modulus of rigidity kg/cm$^2$ | Breaking load kg/cm$^2$ |
|---|---|---|---|---|
| 29.61 | 7.78 | 3.3 | 18,200 | 285 |

EXAMPLE 2

Example 1 is repeated, but the prepolymerization step is carried out in the presence of water and not in the dry phase. The same reactants and the same amounts are used as in Example 1, but 30 parts by weight of water are also added.

When the prepolymerization step is complete, the process is continued as in Example 1 with the polymerization step, except that 90 parts by weight of water are added instead of 120 parts.

After treatment of the polymer as in Example 1, the product obtained has a particle size distribution such that 90% of the particles have a diameter of less than 2 microns and an average diameter of 1.5 microns. The other characteristics of the polymer are summarized in Table 2.

TABLE 2

| Degree of gelling % | Swelling index | Izod impact strength kg-cm/cm | Modulus of rigidity kg/cm$^2$ | Breaking load kg/cm$^2$ |
|---|---|---|---|---|
| 38.69 | 7.17 | 3.2 | 16,300 | 250 |

EXAMPLE 3

Example 2 is repeated, but the styrene/butadiene block copolymer is replaced by a mixture of the styrene/butadiene block copolymer of Example 1 and a styrene/ethylene block copolymer which contains 28% of styrene block and has a molecular weight of 100,000. 1.2 parts by weight of each of these copolymers are used. After treatment as in Example 2, the product obtained has particles with an average diameter of 3.8 microns. The other characteristics of the polymer are summarized in Table 3.

TABLE 3

| Degree of gelling % | Swelling index | Izod impact strength kg-cm/cm | Modulus of rigidity kg/cm$^2$ | Breaking load kg/cm$^2$ |
|---|---|---|---|---|
| 30.35 | 8.51 | 4.1 | 16,000 | 260 |

COMPARATIVE EXAMPLE 4

By way of comparison, Example 2 is repeated, but without the 2.4 parts by weight of the styrene/butadiene block copolymer. In this case, 12 parts by weight of the same terpolymer of Example 2 are used instead of 9.6 parts. After treatment, the product obtained has a very disperse particle size distribution, the maximum particle diameter reaching 15 microns and the average diameter being 7 microns.

The properties of the polymer are summarized in Table 4.

TABLE 4

| Degree of gelling % | Swelling index | Modulus of rigidity kg/cm² | Breaking load kg/cm² |
|---|---|---|---|
| 21.65 | 14.34 | 15,200 | 220 |

COMPARATIVE EXAMPLE 5

Example 2 is repeated, but the elastomeric terpolymer of Example 2, which has a viscosity of 60 centipoises at 20° C., is replaced by a terpolymer which has the same chemical composition as that of Example 1, but has a viscosity of 150 centipoises at 20° C.

After treatment, the polymer obtained has particles with an average diameter of 5.2 microns, 90% having a diameter of less than 10 microns.

Its characteristics are summarized in Table 5.

TABLE 5

| Degree of gelling % | Swelling index | Izod impact strength kg-cm/cm | Modulus of rigidity kg/cm² | Breaking load kg/cm² |
|---|---|---|---|---|
| 36.73 | 7.15 | 2.9 | 16,700 | 250 |

COMPARATIVE EXAMPLE 6

Example 2 is repeated, but an elastomeric terpolymer having a viscosity of 210 centipoises is used.

After treatment, the polymer obtained has a particle size distribution such that the particles have an average diameter of 7 microns, 90% having a diameter of less than 40 microns. Its characteristics are summarized in Table 6.

TABLE 6

| Degree of gelling % | Swelling index | Izod impact strength kg-cm/cm | Modulus of rigidity kg/cm² | Breaking load kg/cm² |
|---|---|---|---|---|
| 34.82 | 7.46 | 3.1 | 17,300 | 250 |

The comparative examples show that both the use of a styrene block copolymer and the viscosity of the terpolymer are critical factors in the present process in order to produce graft copolymers with the desired properties, especially the fine microstructure which characterizes the copolymer produced thereby.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for producing a graft styrene copolymer having a fine microstructure, good impact resistance and good resistance to aging, said process comprising the steps of:
   (a) effecting a prepolymerization of styrene in the presence of an elastomeric EPDM terpolymer, and styrene block copolymer, at a temperature not exceeding 100° C., until polymerization is about 20-30% complete; wherein the amount of EPDM terpolymer is at most 20% by weight relative to the total weight of the organic phase, and the amount of styrene block copolymer is 5-30% by weight relative to the weight of the EPDM terpolymer; wherein the viscosity of the EPDM terpolymer is 30-100 centipoises, expressed as the viscosity of a solution of 5 weight parts of EPDM terpolymer in 95 weight parts of styrene at 20° C.; wherein said styrene block copolymer has a weight average molecular weight of 60,000-300,000, being a styrene/butadiene block copolymer or a mixture of styrene/butadiene block copolymer and styrene-/ethylene block copolymer, the weight ratio of styrene/butadiene to styrene/ethylene copolymer being at least 1:1; and wherein not more than 45% of water is present during the prepolymerization stage; and
   (b) completing the polymerization by effecting a suspension polymerization of the resultant mixture from step (a), at a temperature of 90°-150° C., in the presence of an amount of water such that the weight ratio organic phase:water phase is from 0.8:1 to 1.3:1, and recovering the resultant graft copolymer.

2. A process according to claim 1, wherein the prepolymerization step is effected in the absence of water.

3. A process according to claim 1, wherein said EPDM terpolymer has an ethylene content of 9-73% by weight, a propylene content of 23-77% by weight, and a polyene content of 4-20% by weight, expressed as monomer-derived units.

4. A process according to claim 3, wherein said polyene is 1,4-hexadiene, dicyclopentadiene, tricyclopentadiene, 5-vinyl-2-norbornene, 5-ethylidene-2-norbornene, 5-methylene-2-norbornene, 5-(2-propenyl)-2-norbornene, 5-(5-hexenyl)-2-norbornene, 4,7,8,9-tetrahydroindene and isopropylidene-tetrahydroindene.

5. A process according to claim 1, wherein in step (a), the reaction mixture is subjected to shear forces after phase inversion has occurred.

6. A graft styrene copolymer prepared according to the process of claim 1, having a degree of gelling of 25-40, a swelling index of at most 15, and a microstructure such that 90% of the dispersed elastomer particles have a diameter of less than 5 microns.

7. A copolymer according to claim 6, wherein said swelling index is lower than 10.

8. A process according to claim 1, wherein the amount of styrene block copolymer used in step (a) is 15-25% by weight relative to the amount of the EPDM terpolymer.

* * * * *